US006142459A

United States Patent [19]

Garrett

[11] Patent Number: 6,142,459

[45] Date of Patent: Nov. 7, 2000

[54] UTILITY WORKSTATION

[76] Inventor: Roger T Garrett, 1217 E. Amazon Ave., Portales, N. Mex. 88130

[21] Appl. No.: 09/038,485

[22] Filed: Mar. 7, 1998

Related U.S. Application Data

[63] Continuation of application No. 08/645,830, Aug. 16, 1996, abandoned.

[51] Int. Cl.[7] .............................. F21V 33/00; B60Q 3/02

[52] U.S. Cl. .............................. 269/11; 362/253; 362/97; 269/16; 269/71; 269/17; 269/69

[58] Field of Search .............................. 112/258, 260; 38/102.1; 269/71, 45, 11, 16, 17, 909, 69; 362/97, 127, 253

[56] References Cited

U.S. PATENT DOCUMENTS

| | | | |
|---|---|---|---|
| 1,373,526 | 4/1921 | Price et al. | 269/16 |
| 1,432,725 | 10/1922 | Nolting | 269/16 |
| 2,669,958 | 2/1954 | Sweeney | 269/71 |
| 3,355,162 | 11/1967 | Kerr | 269/71 |
| 4,145,006 | 3/1979 | Webb | 269/71 |
| 4,549,366 | 10/1985 | Gerding et al. | 269/71 |
| 4,566,325 | 1/1986 | Rante | 269/73 |
| 4,771,980 | 9/1988 | Dubbs et al. | 269/71 |
| 5,141,211 | 8/1992 | Adams | 269/16 |

*Primary Examiner*—Thomas M. Sember

[57] ABSTRACT

The utility workstation selectively positions a suspended workpiece before a typically seated operator. It is height adjustable and accepts various types of holding and support attachments that allow various kinds of workpieces to be positioned at various angles and rotations. It provides local light and magnifier sources as well as display and storage options for tools and supplies useful for working with a workpiece. It allows a workpiece to be moved laterally from a fully retracted position, where the workpiece is out of the way of someone getting out of or into his or her seat, to a working position, where the workpiece is suspended at a preferred location and orientation before the operator. It is designed to be operated from the left side or right side of a chair, easy chair, stool, couch, or other type of seating means.

11 Claims, 11 Drawing Sheets

UTILITY WORKSTATION

This application is a continuation of prior application Ser. No. 08/645,830 filed Aug. 16, 1996, and now abandoned.

BACKGROUND OF THE INVENTION

1. Field of the Invention

The claimed invention relates to a utility workstation for positioning various types of workpieces, and especially for positioning workpieces requiring adjustable vertical and/or horizontal rotation. The claimed invention further relates to a utility workstation employing display, storage, and local light and magnifer means.

2. Description of the Prior Art

The claimed invention is a utility workstation, which is herein defined as an adaptable workpiece positioning device for presenting a suspended workpiece before an operator, employing local light and magnifier sources and auxiliary components designed to facilitate the work process; auxiliary components being holders, supports, trays, storage units, and the like.

The work desk is a very familiar example of the basic workstation. We typically place the everyday things that we use to do our work either in, on, or about our desk, while we use the top of our desk to display and negotiate our work. We do this to maintain organization in our work affairs and to minimize our having to get up from our desk to find and use the basic tools and materials of our work. So it is with the utility workstation concept as applied in this document. Auxiliary components provide means for displaying and storing the tools and aids for the work to be performed and the positioning device provides means for displaying and negotiating the work itself.

How one might use the claimed invention is a function of the requirements of the work to be performed in much the same way that the nature of our work principally determines what we put in and on our desk; there are numerous applications which could be claimed for it. For example, the claimed invention is particularly useful for arts and crafts pursuits in that (1) it allows a hobbyist or artist to work while sitting, (2) it provides for an assortment of specialty holders and supports, (3) it allows an object or material to be presented in a variety of positions, (4) it provides local light and magnifier sources, and (5) it provides for various types of trays and containers for tools and supplies.

Needlework crafts are one of the many types of arts and crafts that can greatly benefit from use of the claimed invention. It was, in fact, a perceived need in needlework crafts for a special kind of workpiece holder that led to the realization of the claimed invention. This fact is also the reason why a utility workstation for needlework projects is specified in the Preferred Embodiments section of this document. Needlework includes embroidery crafts such as cross-stitch, needlepoint, beading, and the like; all of which are based on pushing a threaded needle through material front-to-back and back-to-front, a procedure commonly referred to as stitching. A person who engages in needlework is often called a "stitcher". Stitchers generate artistic works and designs which are often framed and hung on walls or set on furniture, or stitched onto wearing apparel, bed and bath items, coverings, and the like. The work created is generally based on an illustration or pattern that presents a detailed view of the design or drawing being reproduced, with color choices being indicated by symbols and numbers. Also available is fabric that has a pattern printed directly onto it.

Most needlework projects require the use of fabric and many stitchers utilize a special type of holder that keeps the fabric taut and presents a framed working surface to the stitcher. This holder is generally a hand-held type of the hoop frame or scroll frame variety. The hoop frame employs two concentric oval- or round-shaped bands that clamp fabric between the inner and outer bands, and the scroll frame employs two spaced rods, held in position by sidebars, onto which fabric is mounted in scroll fashion.

The floor-stand type frame holder supports hand-held fabric holders. The floor-stand basically consists of an arm assembly mounted onto a free-standing vertical support structure. At the free end of the arm assembly is a clamping means that holds a hand-held style fabric holder. The floor-stand is positioned either in front of or to the side of a seated stitcher such that the mounted fabric is suspended before the stitcher. Most available designs include means for adjusting the working height of the workpiece. Some designs allow the frame to be flipped in such a way that either side of the fabric can be worked facing the stitcher. Some designs also allow add-on enhancements such as a tray for storing skeins of colored thread (floss), scissors, needles, threaders, and the like; a lamp for providing local lighting; a chart holder for displaying chart and pattern layouts; a magnifier for viewing detail work and general inspecting; and/or a basket or the like for storing larger items.

The floor-stand frame holder is the design of choice for most stitchers. Available designs, however, are not versatile enough to offer the stitcher the greatest productivity, convenience, and comfort, as they typically offer limited seating and workpiece positioning options. The easy chair, or for some, the end of a couch, is the preferred seating means for most stitchers, yet the high-back chair is almost mandatory for working with the available floor-stand designs, as these designs cannot be properly oriented or brought close enough for a practical workpiece engagement when use from an easy chair or couch is attempted. One must negotiate these designs much as one would a table or desk. Positioning of the workpiece involves having to shift the entire floor-stand or the stitcher about, and entering and exiting the workplace requires moving the entire, unwieldy floor-stand away from the stitcher's chair or moving the stitcher's chair away from the floor-stand. Add-on components serve to make the available designs even more awkward and difficult to move about.

The claimed invention is a free-standing workpiece positioner that easily accommodates all of the aforementioned seating means as it eliminates the need for moving the seating means or the claimed invention by allowing the workpiece to be moved laterally away from the working position and out of the way of a stitcher leaving or entering his or her seat. The claimed invention also integrates auxiliary components into its overall structure as integral parts of the device rather than as add-on extras as is often the case with currently available floor-stand type frame holders. A lamp and magnifier, for example, is standard for the claimed invention, and equivalents for a chart holder, small items tray, and basket are integrated into the work-positioning device at optimum locations and positions.

In conclusion: as evidenced above, the claimed invention can uniquely meet the needs of a real world application with excellent results. Matching the requirements for accomplishing a task with the basic and adaptive features of the claimed invention results in an exceptional tool for task-specific and general purpose utilization.

SUMMARY OF THE INVENTION

The overall object of the claimed invention is to provide a typically seated operator with means for positioning a suspended workpiece as needed, wherein the operator is allowed unencumbered access to a seating means by permitting the workpiece to be moved from a retracted position, where the workpiece is out of the entry and exit path, to a working position, where the workpiece is at a preferred location and orientation for working. The claimed invention includes local light and magnifier sources as well as means for incorporating auxiliary components that provide display and storage options for tools and supplies.

Therefore, one principal object of the claimed invention is to provide a versatile means for positioning a suspended workpiece, permitting that workpiece to be raised, lowered, and rotated horizontally and/or vertically.

Another principal object of the claimed invention is to permit a workpiece to be laterally moved fully into or away from a working position.

Another principal object of the claimed invention is to provide light and magnifier sources.

Another principal object of the claimed invention is to provide for auxiliary components such as holders, supports, trays, and containers as would be useful for a given application.

Another principal object of the claimed invention is to provide a base system that can be configured for operation of the claimed invention from the left side or right side.

DESCRIPTION OF THE PREFERRED EMBODIMENTS

The embodiment of the claimed invention as presented in this section is a utility workstation adapted for needlework applications. It is made of wood so as to accomplish a generally traditional furniture look for the utility workstation that fits in well with needlework's typical home environment work setting.

Figure 1:
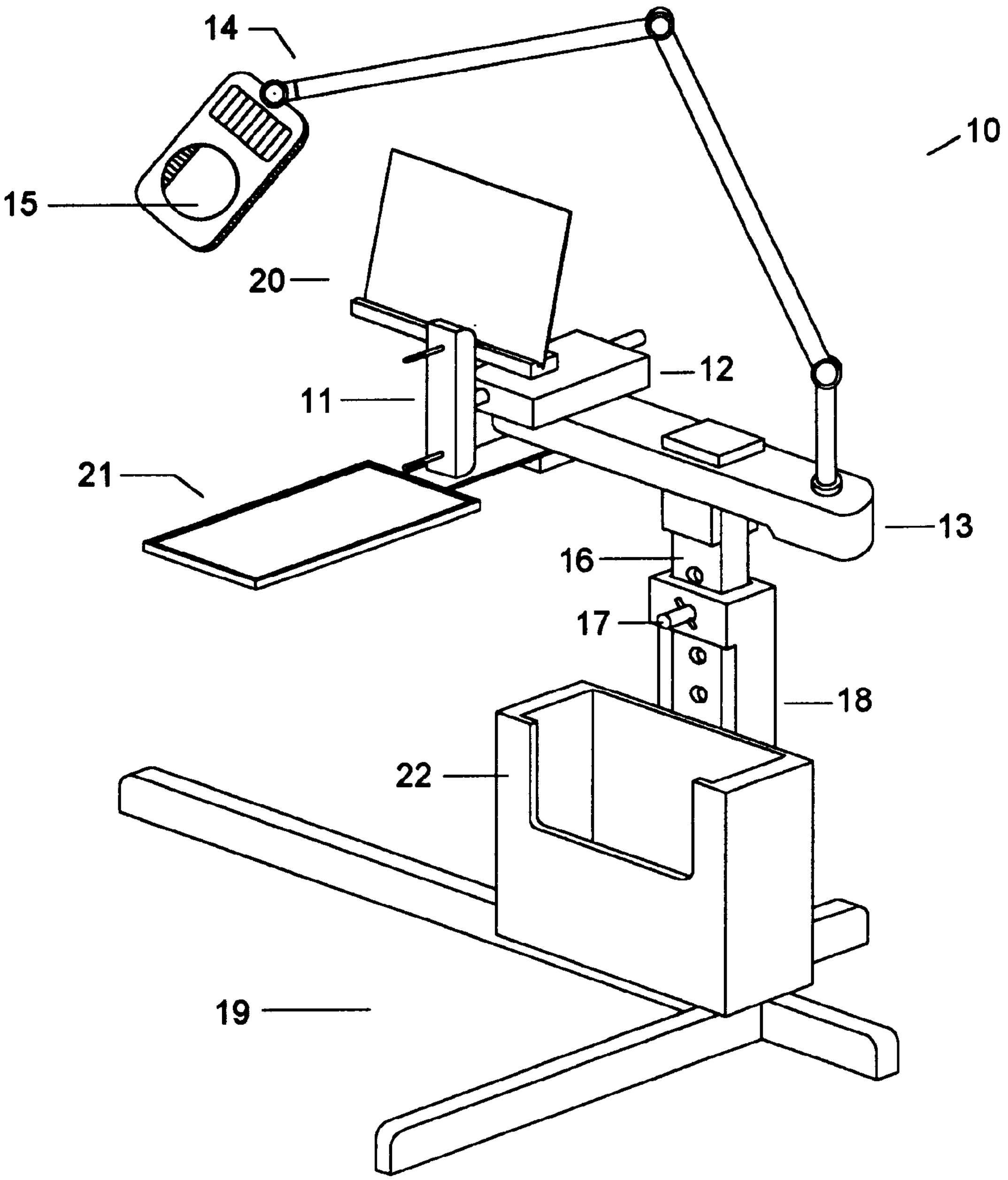
FIG. 1 is a perspective view of the utility workstation adapted for needlework use.

Referring to FIG. 1, the work positioning part of the utility workstation 10 illustrated consists of a holding assembly 11, a headblock assembly 12, a crossbar assembly 13, an adjustable-arm lamp 14 with a built-in magnifier 15, a shaft assembly 16, a peg member 17, a column assembly 18, and a base assembly 19. A first tray member 20, second tray member 21, and storage container 22 are auxiliary components that have been incorporated into the basic work positioning device.

Figure 2:
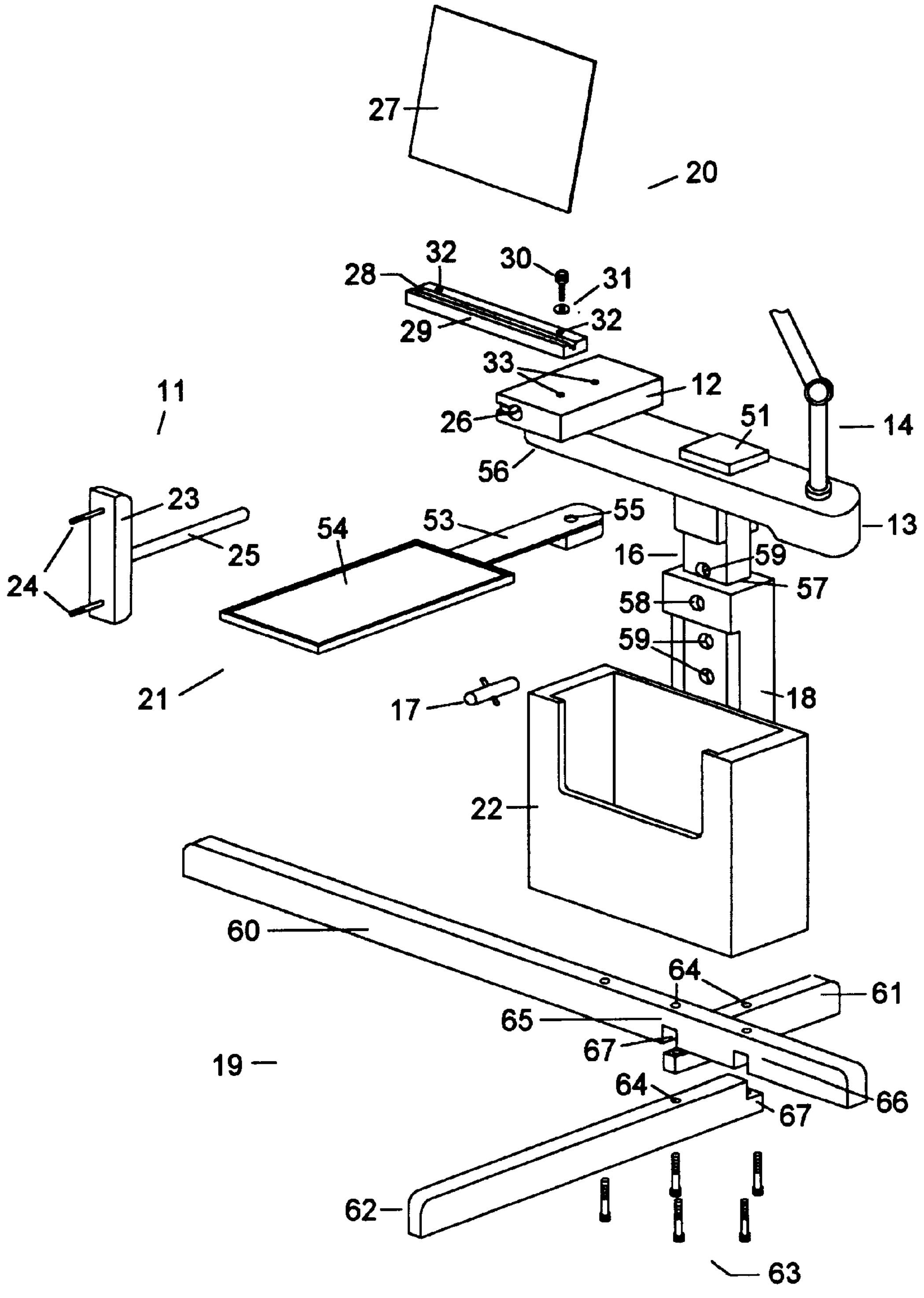
FIG. 2 is a partially exploded perspective view of the utility workstation illustrated in FIG. 1.

Referring to FIG. 2, the holding assembly 11 comprises a support member 23 having two threaded studs 24 perpendicularly projecting from one side for providing a standard means for accepting various types of holding and support attachments, and a standardized cylindrical mounting handle 25 perpendicularly projecting from the opposite side for pivotal insertion into an opening 26 in the end section of the headblock assembly 12. This opening 26 accepts various types of holding and support attachments employing the standardized mounting handle 25.

The first tray member 20 is used to display charts, patterns, magazines, and the like, and consists of a thin, metal backboard 27 fitted into a vertical slot 28 running the length of an elongated horizontal member 29 that mounts onto the top section of the headblock assembly 12. A thumbscrew 30 is passed through a washer 31 and one of two holes 32 in the horizontal member and into one of two embedded threaded inserts 33 in the headblock assembly 12. The pairs of mounting holes 32 and inserts 33 permit the same relative positioning of the first tray member 20 for both left side and right side configuration of the workstation. (Note the positions of the headblock assembly and first tray member in FIG. 6 & FIG. 7). A metal backboard 27 is employed because it allows small magnets and magnetic strips to be used to hold material against the backboard.

Figure 3:
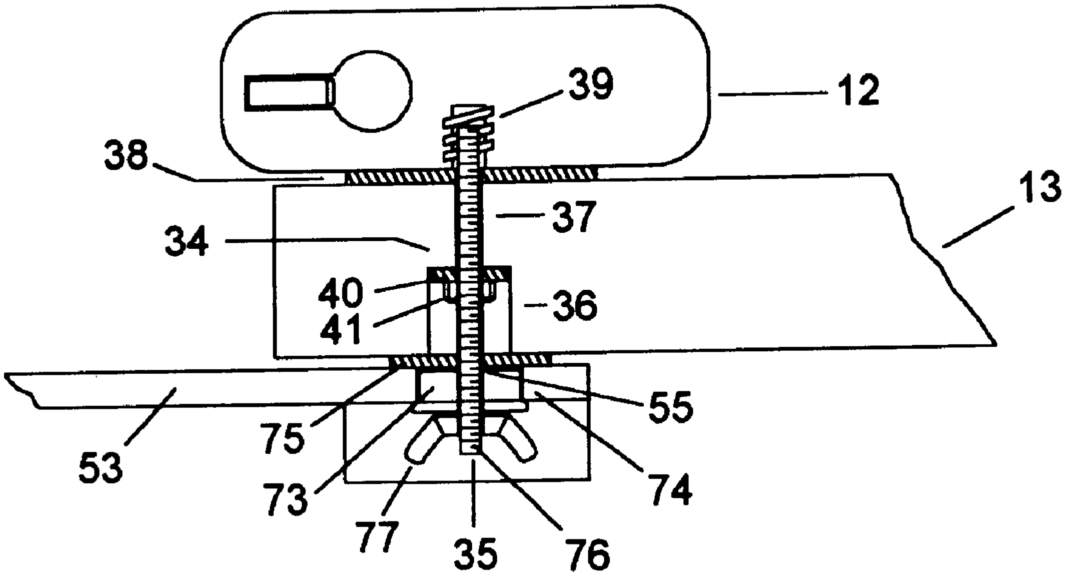
FIG. 3 is an enlarged cross-sectional view of the front end of the crossbar assembly showing the members that are mounted within this area.
Figure 4:
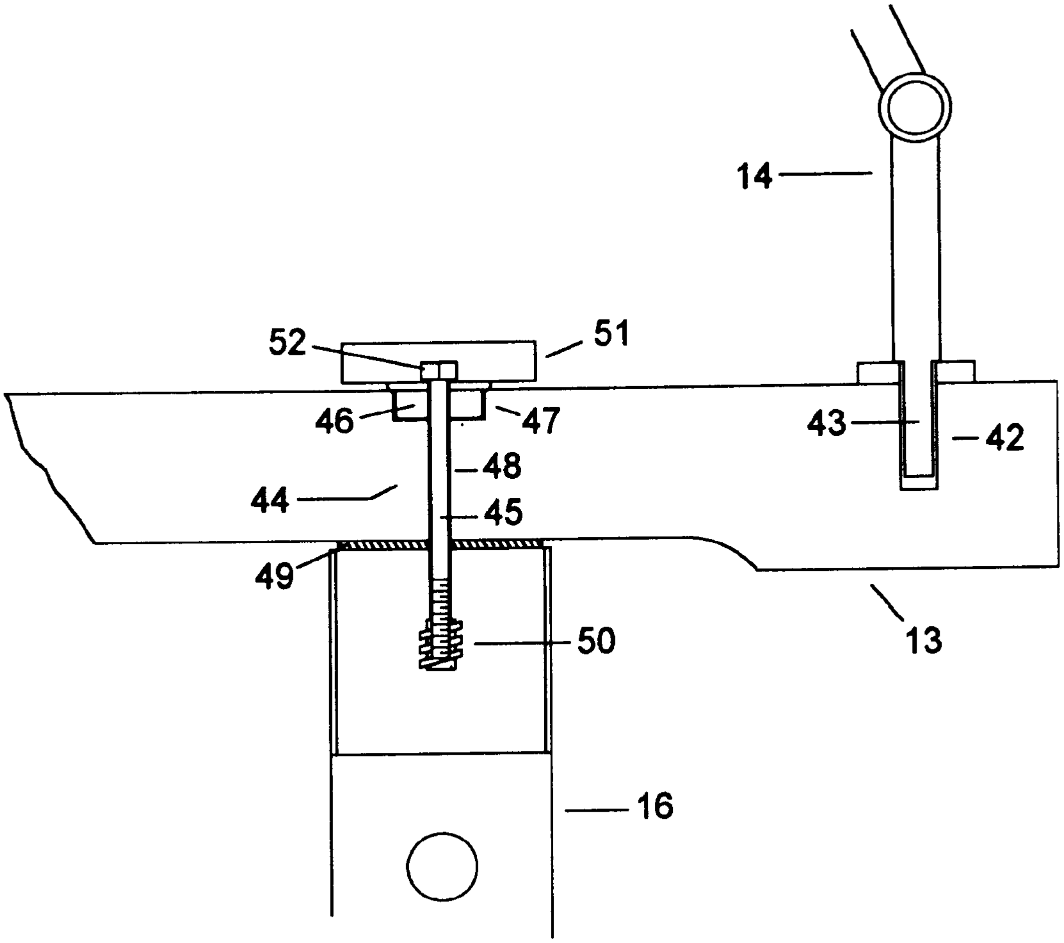
FIG. 4 is an enlarged cross-sectional view of the middle and end sections of the crossbar assembly showing the members that are mounted within this area.

Referring to FIG. 3, a first opening 34 at the front end of the crossbar assembly 13 is for pivotally receiving the headblock assembly 12 which is mounted by passing an all-thread bolt 35 through an enlarged recessed lower portion 36 of the opening, an upper portion 37 of the opening, a washer 38, and into an embedded threaded insert 39 in the bottom section of the headblock assembly 12 followed by a washer 40 and a lock nut 41 that threads onto the all-thread bolt 35 to secure the headblock assembly 12. FIG. 4 shows a second opening 42 at the rear end of the crossbar assembly 13 for pivotally receiving the mounting shaft member 43 of the adjustable-arm lamp 14 and a third opening 44 between the first opening 34 and second opening 42 for pivotally mounting the crossbar assembly 13 onto the shaft assembly 16 by passing a bolt 45 through a flanged ball bearing 46 embedded in the enlarged upper portion 47 of the opening, the lower portion 48 of the opening, a washer 49, and into an embedded threaded insert 50 in the top section of the shaft assembly 16. The ball bearing 46 is used to improve rotational movement. A cap 51 covers the bolt head 52 and the ball bearing 46 for aesthetic purposes.

Referring to FIG. 2, the second tray member 21 provides immediate access to such items as scissors, thread, needles, and the like, placed in the tray. The tray consists of an arm member 53 with a rectangular tray part 54 at one end and an opening 55 at the other end for pivotally mounting onto the bottom section 56 of the front end of the crossbar assembly 13.

The column assembly 18 receives the shaft assembly 16 through a first opening 57 at its upper end. Selective height adjustment of the shaft assembly 16 is accomplished by passing the peg member 17 through a second opening 58 at the upper end of the column assembly 18 and one of the several stops 59 in the shaft assembly 16.

Figure 5:
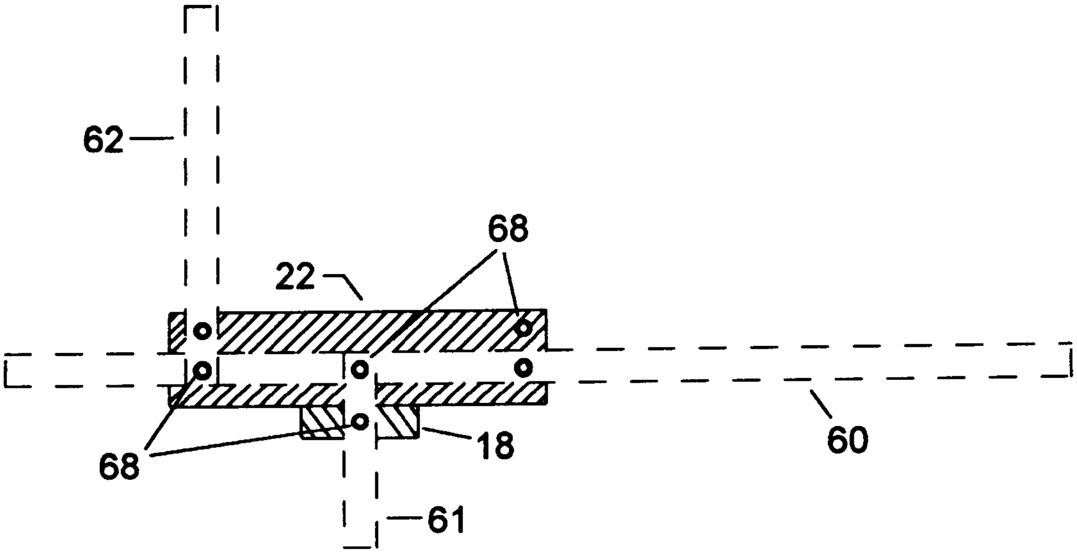
FIG. 5 is a sectional view of the bottom sections of the storage container and the column assembly showing how leg members are mounted.
Figure 6:
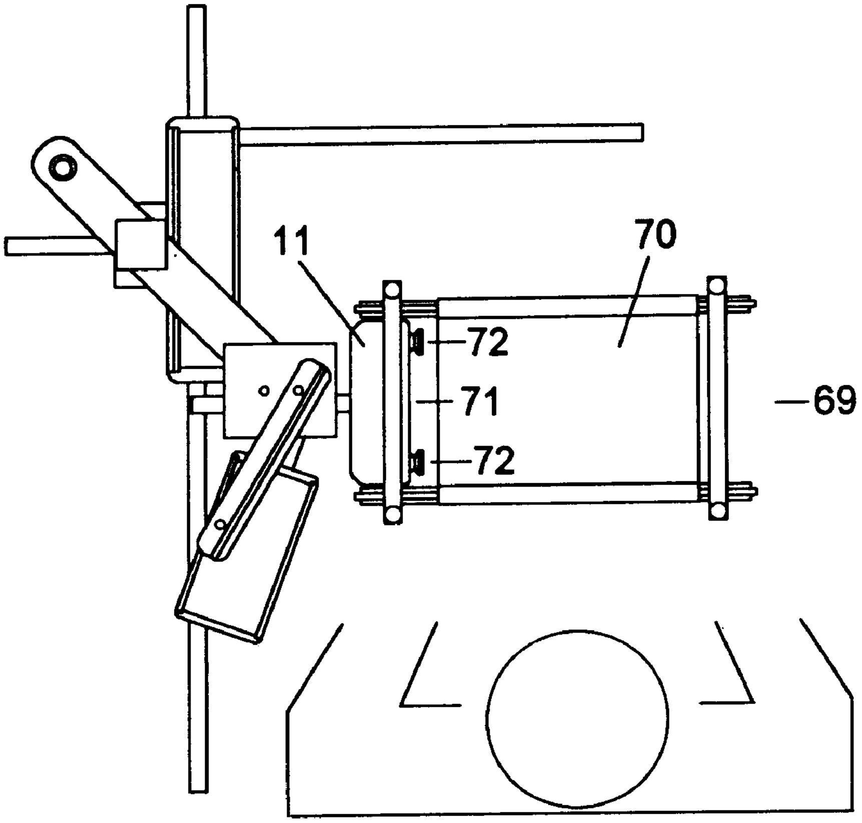
FIG. 6 is a top plan view of the utility workstation and a specialty holder configured for left side utilization.
Figure 7:
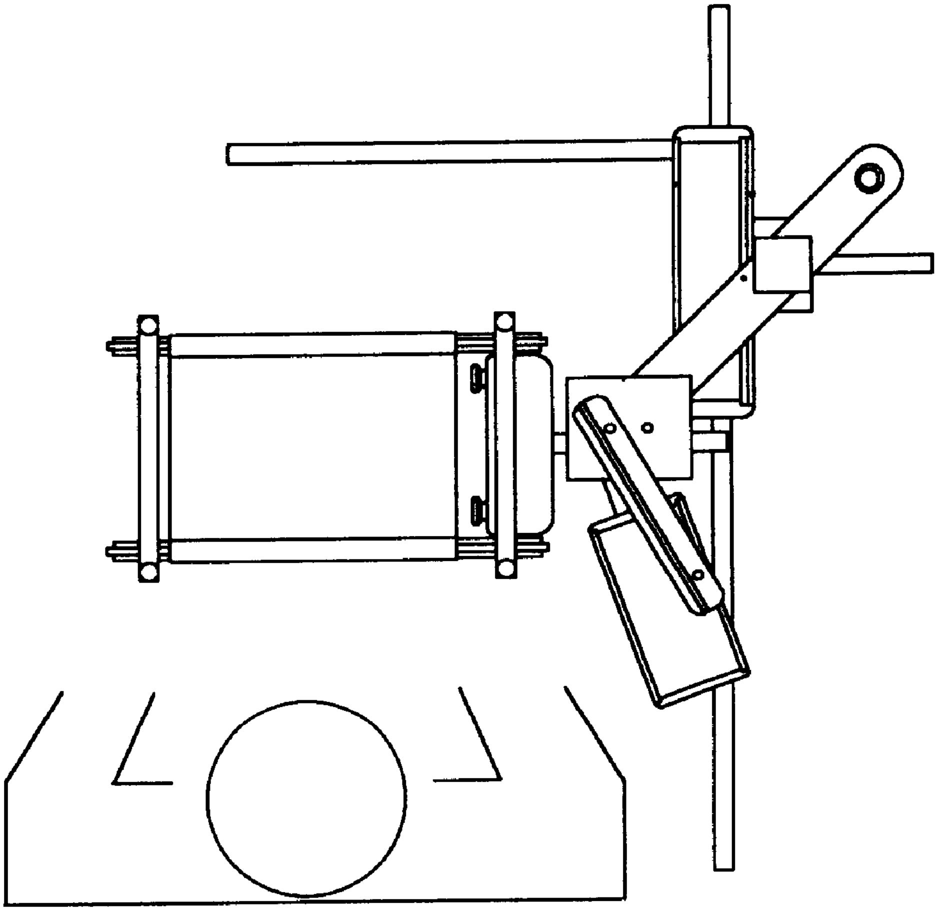
FIG. 7 is a top plan view of the utility workstation and a specialty holder configured for right side utilization.

The storage container 22 is used for storing such items as magazines, charts, fabric, notebook binders, floss boxes, and the like. In this embodiment, the storage container 22 is adhesively bonded to the column assembly 18 to create a sturdier base support structure. A rear leg member 60, support leg member 61, and front leg member 62 of the base assembly 19 are attached to the storage container 22 and the column assembly 18 by passing bolts 63 through openings 64 in the leg members and into the bottom sections of the storage container 22 and the column assembly 18. The support leg member 61 connects at a first attachment point 65 with the rear leg member 60 and the front leg member 62 connects at a second attachment point 66 with the rear leg member 60 through alignment notches 67 located in the leg members. FIG. 5 shows threaded inserts 68 embedded in the bottom sections to receive the bolts 63 used to mount the leg members. The representation of the leg members as shown are arranged to provide the proper orientation of the leg members for right side use. FIG. 2 & FIG. 5 illustrate the arrangement for left side use. FIG. 6 presents an overhead view of the left side setup and includes an example of a scroll frame fabric holder 69. The scroll frame fabric holder 69 is a type of specialty holder for securing the fabric 70 used in needlework projects. The scroll frame 69 mounts onto the holding assembly 11 where a plate 71 and knobs 72 are employed for securing the holder in place. FIG. 7 presents an overhead view of the setup for right side use.

Referring back to FIG. 3, the mounting part of the second tray member 21 is illustrated in detail. As both the headblock assembly 12 and the second tray member 21 are mounted onto the same all-thread bolt 35, a flanged ball bearing 73 is embedded in an enlarged lower portion 74 of the arm opening 55 to improve rotational movement and ensure independent rotation of the two members. A washer 75 is interposed between the arm member 53 and the bottom section 56 of the crossbar assembly 13 to further improve movement. An all-thread bolt 35 is employed because it is a simple way of providing a threaded stud 76 that projects below the bottom section 56 of the crossbar assembly 13. This allows the use of a wing nut 77 to secure the second tray member 21, thereby simplifying the installation of this tray which is removed when the workstation 10 is boxed for shipping or general transport, as when taken along on a trip or vacation. In the absence of a tray or the like at this location, or if a different, separate mounting means was to be employed for mounting auxiliary components here, a standard bolt or bolts could replace the all-thread bolt 35.

Figure 8:
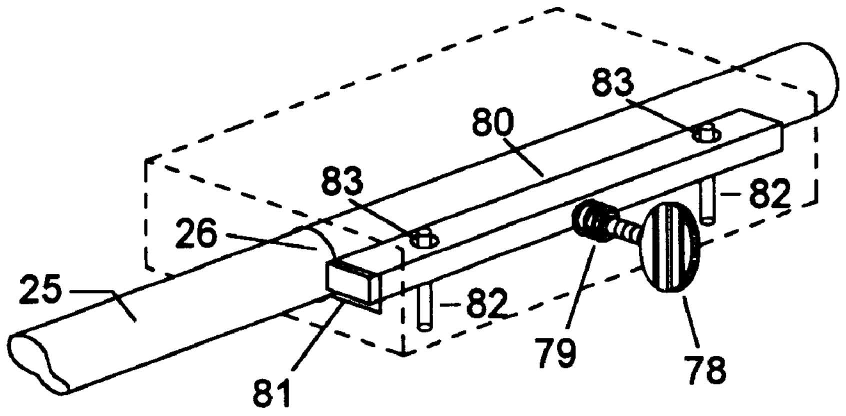
FIG. 8 is an enlarged perspective view of the headblock assembly holding mechanism.

FIG. 8 illustrates a mechanism within the headblock assembly 12 for maintaining the holding assembly and various other holding and support means at a fixed position. A thumbscrew 78 is advanced through a threaded insert 79 to make contact with a friction bar member 80 which presses against the mounting handle 25 to lock the handle in place. The friction bar member 80 fits generally within a slot 81 abutting the headblock assembly opening 26 where its movement is restricted to ranging between being completely out of the opening 26 and being partially into the opening 26. The friction bar member 80 movement is restricted by a pair of vertical posts 82 located within the slot 81 area that pass through openings 83 in the friction bar member 80 to serve as stops for this member.

Figure 9:
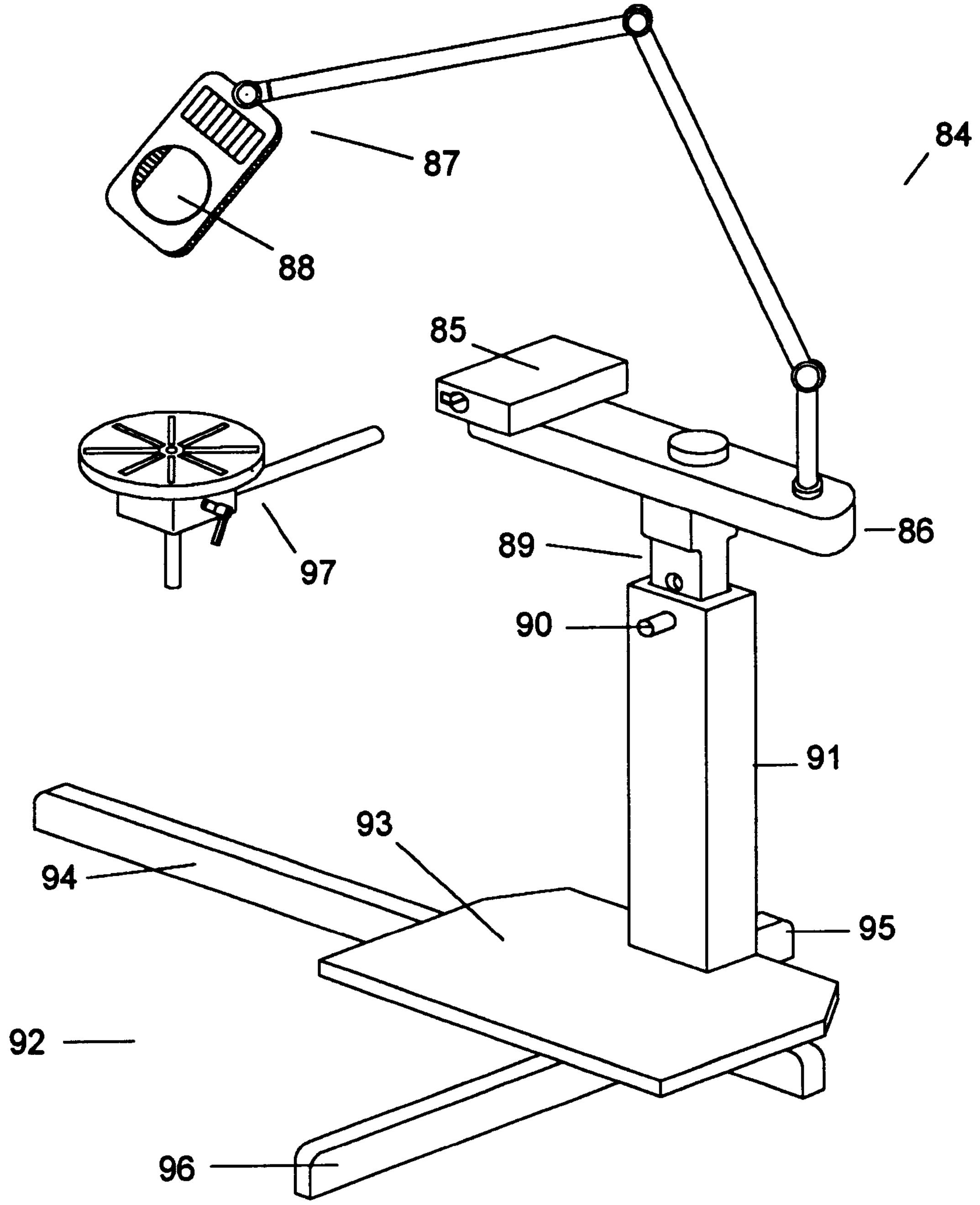
FIG. 9 is a perspective view of an alternate embodiment of the utility workstation.

In FIG. 9, an alternate embodiment of the utility workstation 84 is illustrated which shows a basic work positioning device consisting of a headblock assembly 85, a crossbar assembly 86, a lamp 87 and magnifier 88, a shaft assembly 89, a peg member 90, a column assembly 91, and a base assembly 92 comprising a plate member 93, a rear leg member 94, a support leg member 95, and a front leg member 96. A rotatable, universal support attachment 97 is included to illustrate a holding and support means which inserts directly into the headblock assembly 85. The column assembly 91 shown is a modified form of the column assembly 18 utilized in the needlework utility workstation embodiment and represents a typical embodiment for this assembly.

Figure 10:
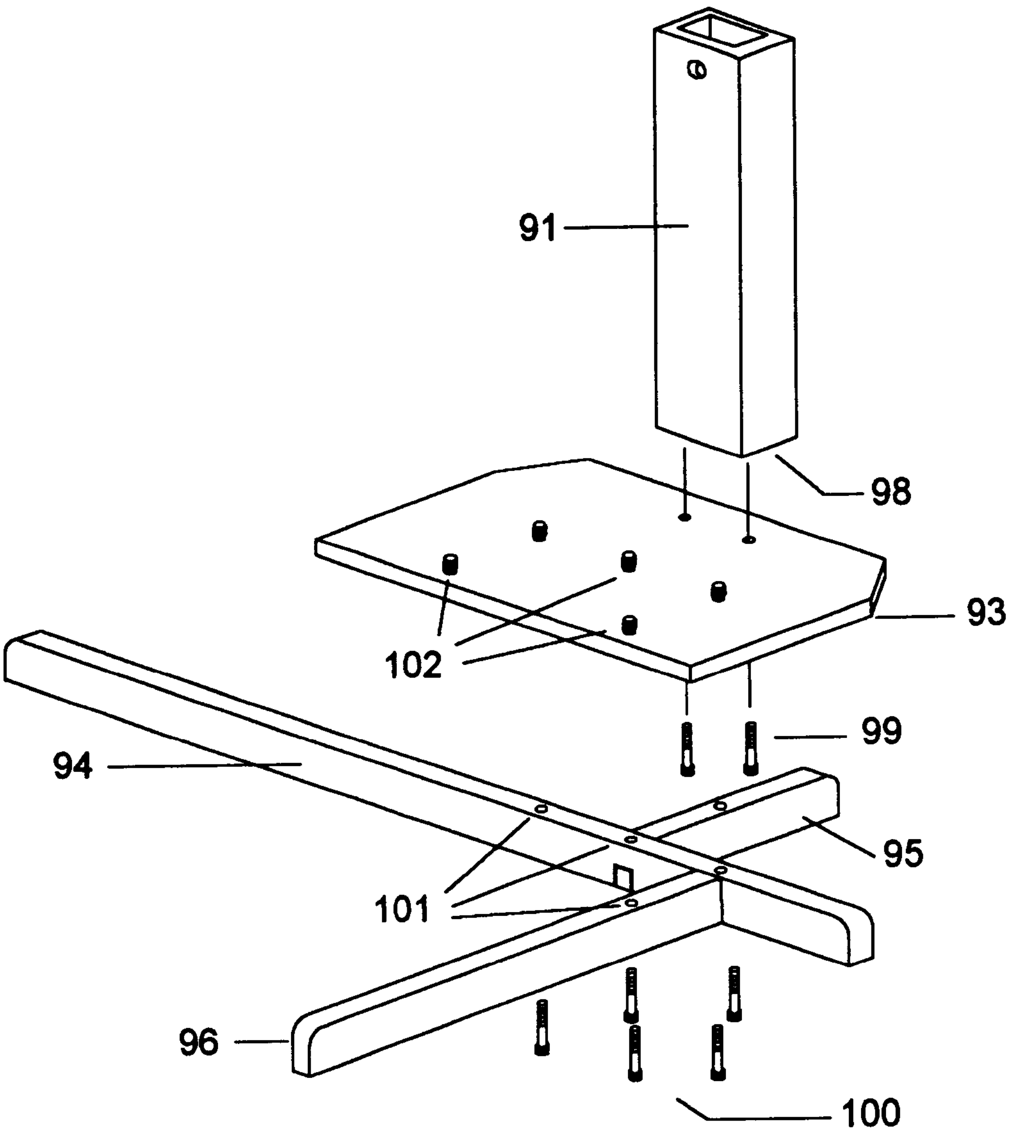
FIG. 10 is an exploded perspective view of the structural base support members of the alternate embodiment illustrated in FIG. 9.

As illustrated in FIG. 10, the plate member 93 is mounted onto the bottom section 98 of the column assembly 91 by bolts 99. The rear leg member 94, support leg member 95, and front leg member 96 are attached to the plate member 93 by passing bolts 100 through openings 101 in the leg members and into threaded openings 102 in the plate member 93. These openings 102 are arranged so as to properly orient the leg members for left side or right side use. Auxiliary components can be mounted directly onto the plate member 93 or, absent leg members, the plate member 93 can be mounted directly onto a floor or other type support surface.

Figure 11:
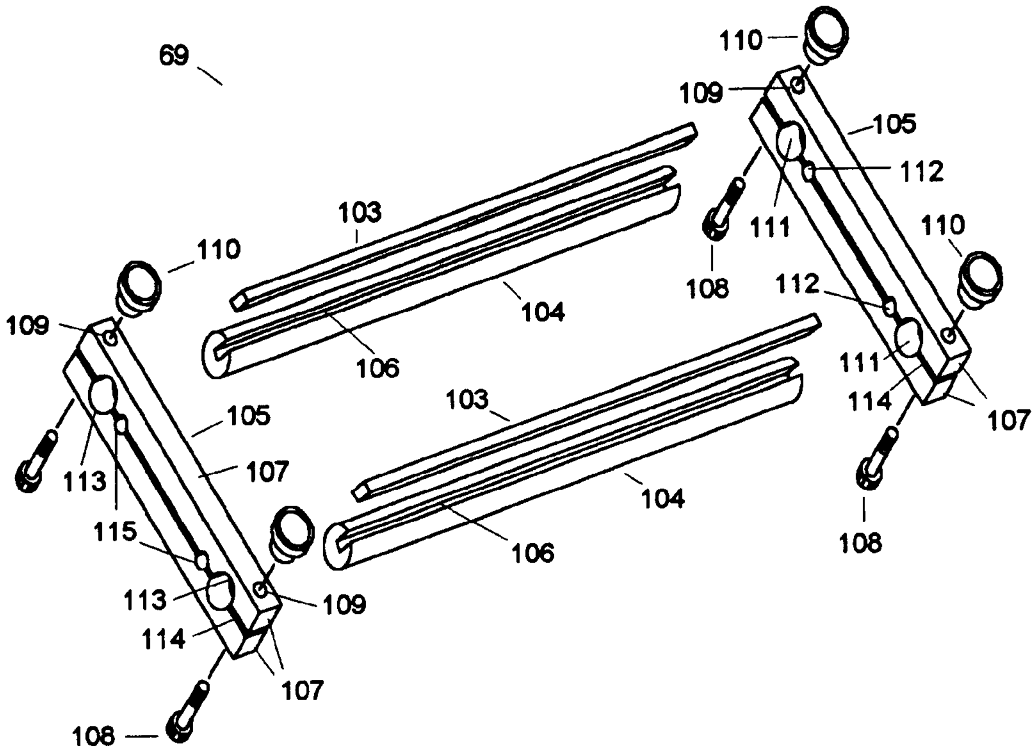
FIG. 11 is a perspective view of the scroll frame members.

FIG. 11 presents a detailed view of the scroll frame 69 shown earlier in FIG. 6 & FIG. 7. The scroll frame 69 consists of two lockbars 103, two scroll rods 104, and two sidebars 105, and is used to scroll fabric or other material. One end of a piece of fabric or the like is laid over a slot 106 in the scroll rod 104 such that it extends slightly beyond the slot 106. A lockbar 103 is placed over the fabric, and pressed down into the slot 106, carrying the fabric along with it. This operation is repeated for the other end of the material using the remaining scroll rod 104 and lockbar 103.

The sidebar 105 is made up of two half-sections 107 held in alignment by bolts 108 that pass through first openings 109 in the half-sections 107 and terminate in threaded knobs 110. Second openings 111 receive the ends of the scroll rods 104, and third openings 112 allow the scroll frame 69 to be mounted onto the holding assembly 11 as shown in FIG. 6 & FIG. 7. The openings for the scroll rods 104 and the holding assembly 11 are arcs in each of the half-sections 107 that form circular openings because one half-section 107 is inverted with respect to the other. First arcs 113 in the second openings 111 are of a radius such that the two half-sections 107 form an opening having a diameter approximately that of the scroll rods 104. However, the depth of the first arcs 113 is such that a small gap 114 exists between the half-sections 107 that permit a clamping action to be exerted on the scroll rods when the threaded knobs 110 are advanced on the alignment bolts 108. Second arcs 115 of a radius slightly greater than that of the threaded studs 24 of the holding assembly 11 create third openings 112 in the sidebar 105 for easy mounting of the scroll frame 69 onto the holding assembly 11.

The fabric, having been secured in the scroll rods 104 by the lockbars 103, is now scrolled on the scroll rods 104 until the distance between the two rods is approximately that of the space between the second openings 111. The ends of the scroll rods 104 are inserted into the second openings 111 of the sidebars 105, and one of the scroll rods 104 is clamped in place by advancing either the upper pair of threaded knobs 110 or the lower pair. The fabric is further wrapped around the unclamped scroll rod 104 until the fabric is taut. Once taut, the unclamped rod is then clamped in place. The scroll frame 69 is mounted onto the holding assembly 11, which in turn is mounted onto the headblock assembly 12. The fabric is scrolled up or down on the scroll frame 69 by loosening the threaded knobs 110, scrolling the fabric up or down, and retightening the threaded knobs 110.

I claim:

1. A utility workstation comprising:

a) A holding assembly capable of accepting various holding and support means, said holding assembly being a removable, generally vertically rotatable, universal mount comprising a mounting handle affixed to a support member;

b) a headblock assembly capable of accepting said holding assembly and various other holding and support means, said headblock assembly comprising a horizontal mounting member having first mounting means for pivotally receiving said holding assembly and said various other holding and support means, and second mounting means for pivotally mounting said headblock assembly;

c) a crossbar assembly capable of accepting said headblock assembly and light and magnifier sources, said crossbar assembly comprising a horizontal mounting member having first mounting means for pivotally receiving said headblock assembly, second mounting means for pivotally receiving light and magnifier sources, and third mounting means for pivotally mounting said crossbar assembly;

d) a shaft assembly capable of accepting said crossbar assembly, said shaft assembly comprising a generally vertical support member having means for pivotally receiving said crossbar assembly;

e) a column assembly capable of accepting said shaft assembly, said column assembly comprising a generally vertical pedestal member having means for adjustably receiving said shaft assembly; and f) a base assembly.

2. The utility workstation defined in claim 1 wherein said holding assembly comprises a mounting handle affixed to a support member, said support member having standardized locations for receiving threaded studs, bolts, and the like, so as to accept said various holding and support means in a standardized manner, and said mounting handle comprising an elongated cylindrical mounting member having standardized dimensions.

3. The utility workstation defined in claim 1 wherein said headblock assembly comprises a horizontal mounting member having a cylindrical opening in the end section of said headblock assembly for pivotally receiving said mounting handle of said holding assembly and said various other holding and support means employing said mounting handle and frictional holding means comprising a friction bar member having means for retaining said friction bar member generally within a slot in said headblock assembly, said slot intersecting said cylindrical opening so as to have an opening along the length of said cylindrical opening for introducing said friction bar member against said mounting handle.

4. The utility workstation defined in claim 1 wherein said crossbar assembly comprises a horizontal mounting member having first mounting means at the front end of said crossbar assembly for pivotally receiving said headblock assembly, second mounting means at the rear end of said crossbar assembly for pivotally receiving said light and magnifier sources, and third mounting means between said first and second mounting means for pivotally mounting said crossbar assembly.

5. The utility workstation defined in claim 1 wherein said shaft assembly comprises a generally vertical support member having a series of graduated stops in the form of openings spaced along the length of said shaft assembly.

6. The utility workstation defined in claim 1 wherein said column assembly comprises a generally vertical pedestal member having a vertically disposed first opening at the upper end of said column assembly for receiving said shaft assembly and a horizontally disposed second opening for adjusting the height of said shaft assembly by aligning one of the said stops in said shaft assembly with said second opening and inserting a peg member through both said second opening and the selected said stop.

7. The utility workstation defined in claim 1 wherein said said base assembly comprises a rear leg member for extending front-to-rear alongside the side part of a seating means, a support leg member transversely connected to said rear leg member at a first attachment point for extending at an opposing right angle to said side part of said seating means, and a front leg member transversely connected to said rear leg member at a second attachment point forward of said first attachment point oppositely disposed to said support leg member for extending alongside the front part of said seating means.

8. The utility workstation defined in claim 1 with a tray member mounted onto said headblock assembly, said tray member comprising a horizontal member having a vertically disposed slot for receiving a backboard or the like.

9. The utility workstation defined in claim 1 with a tray member mounted onto said crossbar assembly, said tray member comprising an arm member having a tray at one end and means for mounting onto said crossbar assembly at the other end.

10. The utility workstation defined in claim 1 with a storage container mounted at the base of said utility workstation, said storage container comprising a generally rectangularly dimensioned receptacle.

11. The utility workstation defined in claim 1 with a scroll frame mounted onto said holding assembly, said scroll frame comprising a pair each of a lockbar, a scroll rod, and a sidebar, wherein said scroll rods in combination with said lockbars secure material, and said sidebars secure said scroll rods, said lockbar comprising an elongated bar member, said scroll rod comprising a rod member having a slot traversing its length, wherein material is placed over said slot and pressed thereinto by said lockbar being placed over said material in alignment with said slot and pushed into said slot, thereby carrying said material into said slot along with said lockbar, and said sidebar comprising two half-sections held in alignment by bolts or the like, said half-sections having complementary first arcs in each of said half-sections, complementary second arcs in each of said half-sections, and holding means comprising knobs or the like mounted onto said bolts so as to exert squeezing action on said half-sections as said knobs or the like are advanced, said first arcs being of a radius and a depth sufficient to allow said first arcs to encircle said scroll rods less the space required for a gap to exist between said half-sections that allows full clamping action on said scroll rods when said squeezing action is exerted by advancing said knobs or the like, said second arcs being of a radius greater than that of said threaded studs, bolts, and the like of said holding assembly so as to allow easy mounting of said scroll frame onto said holding assembly.

* * * * *